United States Patent [19]

Ainscow

[11] Patent Number: 5,081,623
[45] Date of Patent: Jan. 14, 1992

[54] COMMUNICATION NETWORK

[75] Inventor: Frank Ainscow, Winchester, England

[73] Assignee: International Business Machines Corporation, Armonk, N.Y.

[21] Appl. No.: 422,484

[22] Filed: Oct. 17, 1989

[30] Foreign Application Priority Data

Oct. 20, 1988 [GB] United Kingdom ............... 88309854

[51] Int. Cl.$^5$ ............................................. H04J 3/02
[52] U.S. Cl. .................. 370/85.4; 370/85.2; 370/85.7
[58] Field of Search ............ 370/85.1, 85.2, 85.3, 370/85.4, 85.5, 85.6, 85.7, 85.9, 85.11, 85.12, 60, 94.1; 340/825.03, 825.05

[56] References Cited

U.S. PATENT DOCUMENTS

| | | | |
|---|---|---|---|
| 4,641,307 | 2/1987 | Russell | 370/60 |
| 4,677,611 | 6/1987 | Yanosy, Jr. et al. | 370/85.2 |
| 4,680,581 | 7/1987 | Kozlik et al. | 370/85.4 |
| 4,707,828 | 11/1987 | Yamada | 370/85.7 |
| 4,745,598 | 5/1988 | Ulug | 370/85.5 |
| 4,748,560 | 5/1988 | Kataoka | 370/85.9 |
| 4,837,858 | 6/1989 | Ablay et al. | 370/85.2 |
| 4,866,706 | 9/1989 | Christophersen et al. | 370/85.7 |

OTHER PUBLICATIONS

The 6th International Conference on Distributed Computing Systems, 19th-23rd May 1986, Cambridge, Mass., pp. 206-215, IEEE, New York, S. Thanawastien et al.: "A CSMA/CD-Token Ring Hybrid Architecture for Local Area Networks", p. 206, left-hand column, lines 6-20, right-hand column, lines 10-12; p. 210, right--hand column, lines 22-34.
38th IEEE Vehicular Technology Conference, 15th-17th Jun. 1988, Philadelphia, Pa., pp. 44-51, IEEE, New York; A. M. Glass et al.: "Broad-Band Networks for Lan and Radio Applications", p. 45 left--hand col, lines 40-44, p. 46, left-hand col., lines 24-32.
IEEE International Conference on Communications '86, 22nd-25th Jun. 1986, Toronto, vol. 2, pp. 931-933, IEEE, New York; M. S. Goodman et al.: "Application of Wavelength Division Multiplexing to Communication Network Architectures", p. 931, right-hand col, lines 5-34.

Primary Examiner—Douglas W. Olms
Assistant Examiner—Alpus H. Hsu
Attorney, Agent, or Firm—Edward H. Duffield

[57] ABSTRACT

In a communication network for communication between a plurality of nodes over a multi-channel communication medium 6, the network has a number of allocatable channels, . . . for data communication between nodes and a control channel 26 for allocating the allocatable channels to individual nodes. At least one of the channels operates under a token-passing protocol with a limited message packet length whereby selected messages may be sent between nodes with a predetermined maximum delay. The token-passing channel may be the control channel, and the message packets transmitted by the nodes over the control channel may comprise messages for negotiating the allocation of the allocatable channels to the individual nodes. Alternatively, or additionally, message packets comprising data messages unconnected with negotiating the allocation of the allocatable channels may be sent over such a token-passing channel. More than two nodes may be permitted to communicate on one of the allocatable channels, thereby establishing a logical sub-network which can operate using any desired protocol over the allocated channel.

14 Claims, 2 Drawing Sheets

COMMUNICATION NETWORK

FIELD OF THE INVENTION

The present invention relates to a communication network for communication between a plurality of nodes over a communication medium.

BACKGROUND OF THE INVENTION-PRIOR ART

In order to control the interchange of information over a network in which a plurality of nodes are competing for the use of the network, it is conventional to use some form of network protocol.

An example of a network based on one class of protocol, usually called a token-passing protocol, is a token-bus Local Area Network (token-bus LAN). In a token-passing network each node in the network may only transmit information to other nodes when it is in possession of a "token", sent to it by a predecessor node (logically, not necessarily physically) in the network. A node in possession of the token may pass as many messages as it requires, subject to restraints imposed on it by the protocol under which the network is operating, and then passes the token on to a successor (again logically, not necessarily physically) in the network by sending a message including the token to that node. This node then, similarly, transmits as required and then passes the token on to its successor node. The predecessor and successor relationships are arranged in the network to define a logical ring such that the token is passed repeatedly around this logical ring.

By means of this mechanism, only one node is authorised to transmit at any one time, with the result that collisions, which might otherwise occur if two or more nodes tried to transmit at once, are avoided (barring error conditions). Also, if each node is limited to a maximum token retention time on receipt of the token, then the total token rotation time around the logical ring is guaranteed to be below some maximum figure, this figure being dependent on the maximum token retention time at each node, transmission delays and the number of nodes in the network. Hence, the delay between a node requiring to transmit some information and successfully transmitting that information is a known quantity. This is a significant advantage in, for example, a LAN in a manufacturing environment where one node may be the controller of a machine tool and another a control computer giving the machine instructions.

In order for a communication network to be successful, there are many conflicting requirements, such as compatibility amongst the attached devices, performance, flexibility and reliability. By way of example, consider the situation with regard to industrial LANs. The desire to ensure compatibility, was recognized in 1978 by the International Standards Organisation which proposed and defined the Open Systems Interconnection (OSI) model as a basis for the creation of standards for communication between computing devices. Building on this model, a standard has been proposed for an industrial LAN called the Manufacturing Automation Protocol (MAP). The MAP protocol is described in a book by J. Dwyer and A. Ioannou entitled "MAP and TOP" (ISBN 1 85091 355 2). The MAP protocol achieves the requirements for compatibility very well, but at some cost to the other requirements as discussed in an artilce by F Ainscow entitled "Milestones in MAP", published in "Computer Bulletin", Vol 4, Part 2, June 1988, pages 12 and 13, by the British Computer Society.

In pure information handling applications, and in interactions with people, a few seconds delay in the transmission of a message over a communication network is tolerable in most cases. By contrast, where computers are being used to control the operation of mechanical devices, there may be a need for "real time" operation—that is a guaranteed maximum delay time in the order of milliseconds as opposed to hundreds of milliseconds or longer. As indicated above, a token-passing technique of giving access to the communication channel gives the possibility of guaranteeing a maximum response time. The MAP is based on a token-passing protocol. However, the need to handle efficiently long files under the protocol means that the token retention time is relatively high with the result that the time guaranteed is in the order of one second, even for moderately sized networks.

One technique for reducing the guaranteed time is to subdivide a network into a plurality of smaller networks. This approach is not without its difficulties, however, as it introduces the problem of inter-network communication at gateways, increases the transmission delay to nodes on the other networks and means compromising compatibility and flexibility.

For communication networks where a guaranteed maximum response time is not a requirement there exists a class of protocols termed Carrier Sense Multiple Access/Collision Detection (CSMA/CD) protocols. An example of such a protocol is the "Ethernet" protocol. In a CSMA/CD network, any node requiring access may attempt transmission at any time when the network is not active. Collisions between two or more nodes which attempt transmission at the same time are handled by all nodes ceasing transmission then attempting transmission some time later. The delay before attempting retransmission is variable, to avoid two or more nodes repeatedly issuing colliding transmissions, leading to inability to transmit. This type of network has the advantage that at low traffic levels, the delay to transmit a message is generally low. However, it has the disadvantage that at high traffic levels, the delay to transmit a message can get very long indeed, due to frequent collisions occurring, and consequently an unacceptable delay may be experienced in transmission. Further, at high traffic levels, the high level of collisions leads to very inefficient usage of the communication channel, just at a time when high capacity is desirable. Complicated algorithms are sometimes employed to prevent the delays becoming excessive, especially in the case of low priority nodes.

In Japanese patent application JA 61 102 842 (Ricoh Co Ltd), a CSMA/CD network is proposed which uses frequency division multiplexing to provide a fixed control channel and a number of data transfer channels, each channel occupying a different frequency band. Two nodes wishing to set up a one-to-one communication path negotiate over the control channel to find a free data transfer channel and agree to communicate over this channel. In this way, a number of one-to-one communications can take place simultaneously, giving high priority nodes the required rapid access to the network (assuming that these nodes maintain a data transfer channel allocated to them at all times). However, it still takes an indefinite time to set up the one-to-one communication links. This is because, as with all CSMA/CD type communication channels, the time taken to communicate over the CSMA/CD control channel cannot be guaranteed and consequently negotiating the use of a data channel over the control channel takes an indefinite time. As a result, at least some nodes, say high priority nodes which make infrequent use of communications so that it would be uneconomic to allocate them a data channel permanently, could experience unpredictable delays before being allocated a channel. An example of such a node is an error monitoring node, designed to signal to the system when a particular parameter exceeds its permitted range (e.g. speed of a conveyor, temperature of a furnace, etc). This would not be acceptable in many network applications such as, for example, an industrial LAN.

OBJECT OF THE INVENTION

An object of the invention is to provide a communication network which mitigates the problems of prior art networks.

BRIEF SUMMARY OF THE INVENTION

Accordingly, the invention provides a communication network for communication between a plurality of nodes over a multi-channel communication medium, the network comprising a plurality of allocatable channels for data communication between nodes and a control channel for allocating the allocatable channels to individual nodes, characterised in that at least one of the channels operates under a token-passing protocol with a limited message packet length whereby selected messages may be sent between nodes with a predetermined maximum delay.

By constraining the message packet length on the token-passing channel, the token retention time at each node and, consequently, the token cycle time for that channel can be kept low. It is possible to have a limited message packet length on the token-passing channel while still allowing for the efficient transmission of longer messages because of the availability of the allocatable channels for the bulk of the transmission of information.

Thus, a network in accordance with the invention can provide a guaranteed maximum delay time for any node wishing to communicate selected, albeit short, messages over the communication medium. This guaranteed maximum delay can be kept low because the token-retention time at each node can be set to a low level on the token-passing channel as only short messages are sent on this channel. With prior art, single channel, token-passing networks, the token retention time must be kept large to accommodate nodes requiring to transmit a large amount of data. Splitting the data into smaller packets, one to be transmitted on each receipt of the token, is undesirable as this leads to very slow transmission of this data and complications to the protocol. Prior art multi-channel networks based on CSMA/CD protocols cannot provide a guaranteed maximum delay because of the nature of those protocols.

Preferably, a channel operating under a token-passing protocol with a limited message packet length is the control channel, and the message packets transmitted by the nodes over the control channel comprise messages for negotiating the allocation of the allocatable channels to the individual nodes. In this way a maximum guaranteed delay can be provided for the allocation of an allocatable channel for the transmission of data messages between nodes.

The message packets transmitted by the nodes over the control channel preferably also comprise data messages unconnected with negotiating the allocation of the allocatable channels, whereby urgent data messages can be communicated between nodes over the control channel without needing to wait for the allocation of an allocatable channel. By permitting the control channel to also carry information packets which are not concerned with allocation of the allocatable channels, a node which does not currently have a channel allocated to it can nevertheless transmit an urgent message (e.g. an error message) without encountering the delay of setting up an allocated channel and without the need to set aside a channel specifically for urgent communications.

A dedicated channel, other than the control channel, which operates under a token-passing protocol with a limited message packet length may, however, be provided and message packets comprising data messages unconnected with negotiating the allocation of the allocatable channels may be transmitted by the nodes over this dedicated channel. In this way urgent data messages (e.g. error messages) can be communicated between nodes over this dedicated channel without needing to wait for the allocation of an allocatable channel.

In the particular example of a communication network described later, more than two nodes are permitted to communicate on an allocatable channel, thereby establishing a sub-network on this channel. These nodes can communicate using any desired protocol over this channel, such as MAP or Ethernet, or a token-passing protocol with a limited message packet length as discussed above, in order to meet particular requirements of the nodes on this sub-network. This arrangement allows for a plurality of sub-networks to be established on a single physical communication medium in an easy and flexible manner. Thus a plurality of sub-networks may each operate on a separate allocatable channel, each sub-network operating under the same or a different protocol, or no protocol. There could, for example, be two or more channels in the network which operate under a token-passing protocol with a limited message packet length. One could be the control channel, and one could be a dedicated channel as mentioned above dedicated to serving high priority nodes which make infrequent use of communications.

If each channel operates in a respective frequency band, channel separation is possible in a manner which permits compatibility with existing single channel equipment to be maintained for a token-passing channel while providing the additional channels. The number of channels which can be provided will depend on the bandwidth of the communication medium. For compatibility and reliability reasons, the frequency band of the token-passing channel should preferably be fixed. However this need not be the case and the bandwidth and the frequencies of the channels could be variable so that they may be allocated in a flexible manner depending on the needs of the nodes on the network.

DESCRIPTION OF PREFERRED EMBODIMENT

Preferably, one or more nodes each comprises a switchable communication adapter which is switchable between frequency bands, whereby said one or more nodes can communicate on a plurality of channels. An alternative would be to provide said one or more nodes with a plurality of fixed communications adapters, one for each channel. However, this would be a more expensive solution and would limit flexibility.

A node can additionally comprise a second communication adapter which is operable in at least the frequency band of a channel operating under a token-passing protocol with a limited message packet length, whereby said at least one node can communicate simultaneously on this token-passing channel and on another channel. Such nodes will operate efficiently since they are permanently communicating on the token-passing channel. The provision of a second communication adapter avoids potential delays and other complications which might result from a node leaving and re-entering the token-passing ring. If required, a node could comprise more than two channel adapters, for example if there are two or more token-passing channels and a plurality of allocatable channels as mentioned above.

If a node comprises only a single switchable communications adapter, it preferably maintains a ring maintenance flag for indicating whether ring maintenance has been performed during the last complete rotation of the token on the token-passing channel, a logical ring being formed by the passing of the token on the token-passing channel, and ring maintenance is performed if the ring maintenance flag is not set when the token is received by that node.

Not all of the nodes in the network need to operate on the allocatable channels. For example, a node which merely needs to issue very short messages (e.g. indicating an error condition) could be permitted to do so by sending an information packet on a token-passing channel as mentioned above. Such nodes have the advantage that they are simple (and hence low cost) since they only require a single non-switchable communication adapter. Accordingly therefore, some nodes comprise a fixed frequency band communication adapter which operates solely in the frequency band of a channel operating under a token-passing protocol with a limited message packet length, whereby communication by means of the fixed frequency band communication adapter is solely on this token-passing channel.

The invention finds particular but not exclusive application in local area networks in which the communication medium is a broadband cable, and the communication adapters are modems. The invention equally finds application in other types of network using a multichannel communication medium, such as fibre-optics based communication networks.

BRIEF DESCRIPTION OF DRAWINGS

A particular example of a communication network in accordance with the invention is in the following with reference to the accompanying drawings in which.

Figure 1:
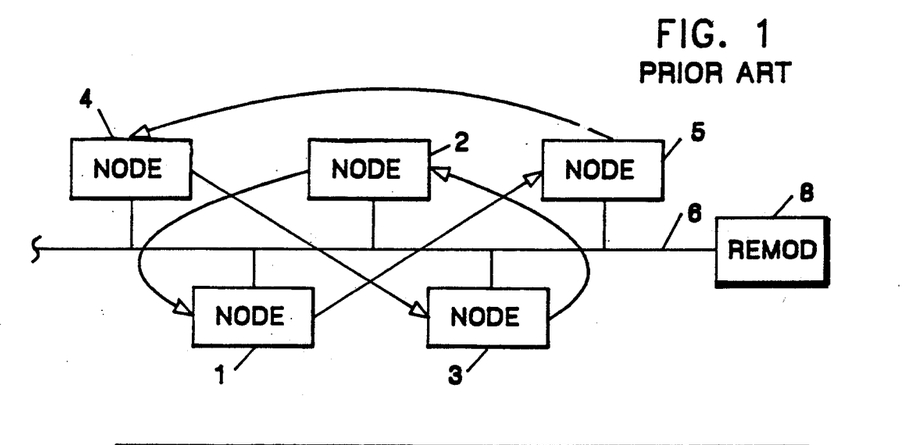
FIG. 1 is a schematic diagram of a typical arrangement of nodes on a token-bus communication network.

FIG. 1 is a schematic diagram of a typical arrangement of nodes on a token-bus communication network, such as is known in the prior art. For reasons of convenience of illustration, only five nodes are shown. In practice, the number of nodes may be substantially more, or may be less than five. The communication network shown has nodes 1 to 5 communicating via a communication medium (e.g. a broadband cable) 6. Each node in the network may only transmit information to other nodes when it is in possession of a "token", sent to it by its predecessor node in the network. The predecessor of node number 2, for example, is node number 3. The token is a unique identifier which the nodes recognise as giving them authority to transmit.

When a node (say node 2) is in possession of the token, it may pass as many messages as it requires, subject to restraints imposed on it by the protocol under which the network is operating to the other nodes in the network, and it then passes the token on to its successor node (i.e. node number 1 is the successor of node number 2) by sending a message including the token to that node. This node (e.g. node 1) then, similarly, transmits as required and then passes the token on to its successor node (the successor of node 1 is the node 5).

It can be seen, therefore, that the predecessor and successor relationships are arranged to define a logical ring such that the token is passed repeatedly around this logical ring. It can also be seen that the predecessor and successor relationship is primarily a logical, as opposed to a physical one. The communication medium here is assumed to be a single broadband cable 6 connected at one end, the so called head end 7, to a head end remodulator 8. The broadband cable normally used for token-bus LANs, with the repeaters and other equipment has a band-width of about 400 MHz. In a single cable system such as that illustrated, the total bandwidth is split into high and low regions for transmission in opposite directions, and signals are transferred from one to another by the head-end remodulator 8. In a dual cable system, the full bandwidth is available in both directions and the head-end remodulator is replaced by a repeater. In a network with a fibre optics communication medium, the available bandwidth can be orders of magnitude larger. It is possible in a fibre optics network for the network to be arranged in a star formation as will be well known to a person skilled in the art.

Consider a LAN based on a token-passing protocol and having 100 nodes spread over a radius of 5 Km. Bearing in mind the geographical spread, the worst case propagation time from the head end to the most remote node is of the order of 35 microseconds. The maximum time taken to transmit a token from one node to the next is given by the worst-case propagation time plus the time allowed for the recipient node to respond to receipt of the token. This total is called the transmission time (TT). Another parameter of the network which directly affects performance is the maximum retention time (MRT) for which a node is permitted to retain the token before passing it on. Once these times are known, the maximum access time for the network is given by the following relationship:

Maximum access time = number of
nodes × [TT + MRT].

An estimate of the ultimate performance which could theoretically be obtained from a network may be found by assuming that the operation of the nodes is arbitrarily fast by the use of sufficiently high processing speeds and large bandwidth. This leaves only the propagation time as the limiting factor; so for the network of 100 nodes and 5 Km radius, the transmission time may be about 35 microseconds and the token retention time may be taken as zero, giving a worst case maximum access time of 3.5 milliseconds.

In practice, real networks do not approach this limit, for two reasons. Firstly, bandwidths are not arbitrarily wide. The standard channel bandwidth in a broadband system is 12 MHz, giving a data rate of 10M bit/second. The transmission of 1K bytes, whether data or protocol overhead, requires 819.2 microseconds. In order to allow the transmission of large files of data without excessive fragmentation, the maximum token retention time must be set to a large value, typically 5 to 10 milliseconds. Secondly, with the node operation taking a finite time, the transmission time comes out at about 40 microseconds. With these values, the 100 node, 5 KM network falls short of the theoretical ultimate performance by more than two orders of magnitude, with the result that a MAP network of this size is unusable as a real-time control system such as an industrial LAN.

An industrial LAN having 100 nodes within a radius of 5 Km is described in the following as an example of a communication network in accordance with the invention, although it should be appreciated that the present invention is neither limited to industrial LANs, nor to networks of this size.

With a cable bandwidth of 400 MHz, a single broadband cable could accommodate about 12, and a dual cable about 30 simultaneous channels, each carrying about 10M bits per second. Once again, the figures for fibre-optics would be orders of magnitude greater. In prior art token-bus networks, this available bandwidth is not fully used. The invention capitalises on this available bandwidth by providing a plurality of allocatable channels on which message communication between nodes can take place, in addition to a control channel. As the bulk of the data to be transferred between nodes can be sent over the allocatable channels, the individual message length on the control channel can be limited to a low value and the token retention time for the nodes, and consequently the total token retention time can be kept short, increasing the rate of response of the communication network.

The characteristics of this example of an industrial LAN are summarised in Table 1 below.

TABLE 1

| Maximum propagation time (as before) | 35 us |
| Transmission time | 40 us |
| Control channel max message length | 75 bytes |
| Control channel max token retention time | 60 us |
| Token transfer time per node | 100 us |
| Guaranteed access time for 100 nodes | 10 ms max |

With a 10 milliseconds guaranteed access time, it is possible for each node on the network to transmit a short message 100 times per second, which is sufficient for the control of industrial machinery.

Figure 2:
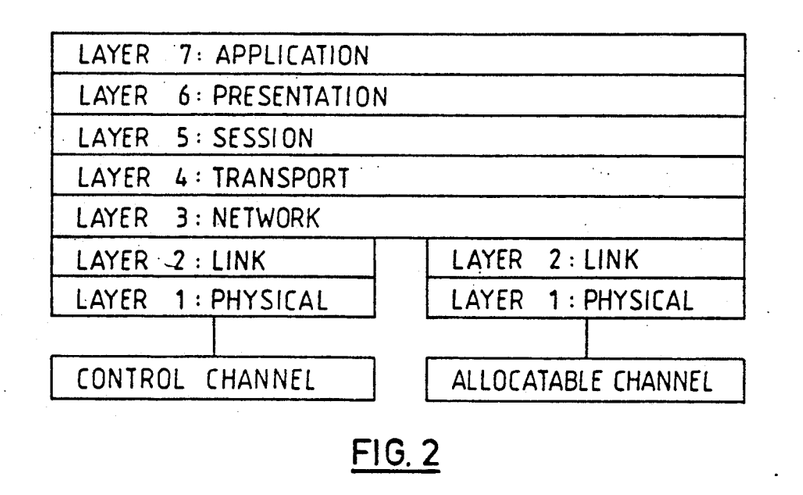
FIG. 2 is a graphical overview of the architecture of an example of a communication network in accordance with the invention.

FIG. 2 is a graphical description of an architecture for this example of a communication network in accordance with the present invention. Here, the structure of the Open Systems Interconnection (OSI) model has been adopted for both the token-passing channel and the allocatable channels. This Figure should be self explanatory to anyone versed in the OSI standards, and accordingly it will not be discussed further herein. The token-passing channel adheres to OSI standards in order to retain compatibility with existing LAN equipment based on those standards. As, however, the allocatable channels are allocated dynamically by negotiation amongst the nodes, any protocol, or no protocol, may be used on these channels once allocated, provided that there is a mechanism for closing down the channel on completion, to make it available for re-allocation.

Figure 3:
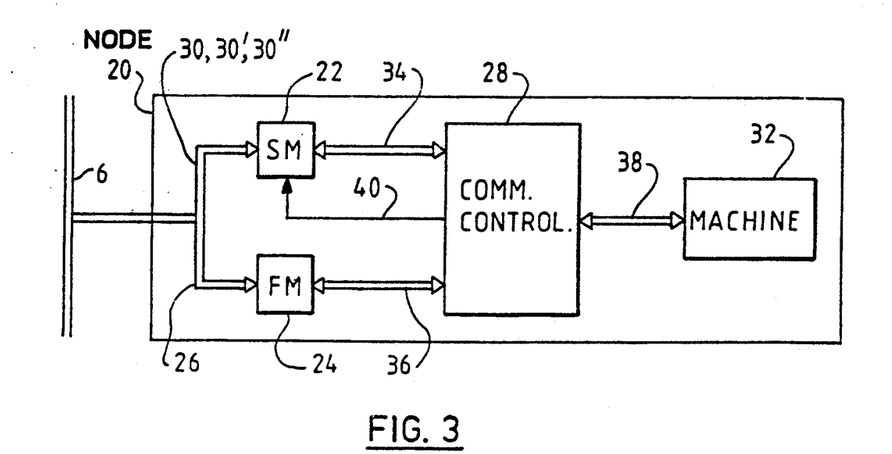
FIG. 3 is a schematic block diagram of the architecture of high performance network node for simultaneous transmission on two channels.

FIG. 3 illustrates the architecture of a node 20 as incorporated in this example of a communication network in accordance with the invention. The node comprises the following components:

a switchable channel adapter, or switchable modem 22, capable of operating over a range of frequencies, preferably the full range of frequencies provided by the communication medium, and a second channel adapter, or fixed modem 24 operable on the frequency of the control channel 26;

logic, in a communication controller 28 for implementing the protocol chosen for the control channel 26—in this case IEEE 802.4—and for associating it with the second modem 24;

logic for implementing whatever protocol or protocols are to be used by the station on the allocated channels 30, 30', 30", ... and for associating them with the switchable modem 22;

supervisory logic, also in the communication controller 28 which recognises the need for a channel and uses the control channel protocol to negotiate the provision of one;

the task (machine 32) operating at the station and initiating or responding to transmissions on the network.

A station may, for example, have the duty of handling the downloading of part programs to a numerically controlled machine tool (i.e. machine 32 comprises the machine tool and appropriate processing logic) from a central database (not shown), whilst periodically transmitting a reading of the cutting tool temperatures to a remote monitoring program. It may also be required to handle occasional time-critical messages such as notification of loss of coolant supply. For the first task, an appropriate protocol would be MAP FTAM, while for the second, a simple serial point-to-point message service would suffice. The communication controller 28 in this station is able, therefore, implement both of these protocols and is able to associate either of them with an allocatable channel 30, 30', 30", ... by means of the switchable modem 22. It is also able to implement IEEE 802.4, to associate it with the control channel 26 by means of the second modem 24, and to use it to acquire channel(s) from time to time. For time-critical messages, the station is able to send short messages on the control channel 26 using the second modem 24. In FIG. 3, and also FIGS. 4 and 5, a double connecting line is representative of paths/channels for data and control information and a single connecting line is representative of a control path. Thus, the internal paths 34, 36 and 38 are for the passing of data and control information between the functional units indicated in the station 20, and the control path 40 is used for channel selection by the switchable modem 22.

The communication controller 28 (also the communication controllers 28' and 28" in FIGS. 4 and 5 respectively) are typically implemented in the form of software logic running on general purpose computing hardware such as a microprocessor and associated memory, etc. Also, in each of those figures, the communication controller and the machine may either be separate from one another, or they may be separate logical entities in the same physical device. For example, they may be separate tasks operating in a general purpose computer.

With the architecture illustrated in FIG. 3, it possible for the node 20 to remain a member of the token-passing ring even whilst it is using another channel to transfer data. Whereas the switchable modem is frequency agile in order that it may be switched from channel to channel, the second modem 24 is permanently allocated to the control channel and consequently need not be frequency-agile. High-priority short messages can be transmitted on the control channel without interrupting the transmission or reception of a low-priority long message on an allocated channel.

Figure 4:
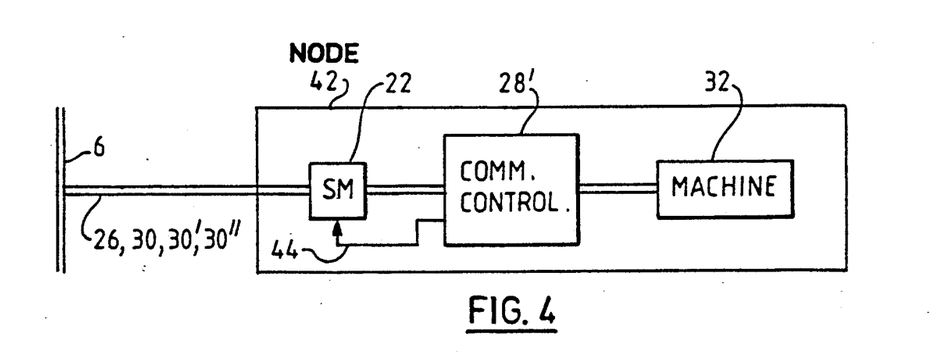
FIG. 4 is a schematic block diagram of the architecture of a network node having a single, switchable communication adapter.

FIG. 4 is a schematic illustration of a lower cost alternative to the FIG. 3 architecture for a network node. The node 42 shown in FIG. 4 comprises a single, switchable modem 22. It does not include the second modem shown in FIG. 3. This modem 22 allows communication to be made on only one channel at any one time, but is capable of switching between channels. The switchable modem in FIG. 4 is, in the normal state, set to the frequency of the control channel 26 and consequently its node forms part of the token ring on that channel. On allocation of its node to an allocatable channel, the communication controller in the node 42 causes the frequency of the modem to be changed by means of control signals on path 44 to that of the allocated channel (i.e. one of channels 30, 30', 30'', . . . ) and drops out of the token-passing ring in the control channel. The provision of a single modem of this type forms a relatively low cost approach to attaching nodes to the network, since only a single modem is needed. The sequence of events involved in allocating a channel, which is described below, is the same for node architectures illustrated in both FIG. 3 and FIG. 5. However, in the case of a single switchable modem, some delay can be experienced in rejoining the token ring on giving up the allocated channel. This is due to characteristics of IEEE 802.4 as explained later.

Figure 5:
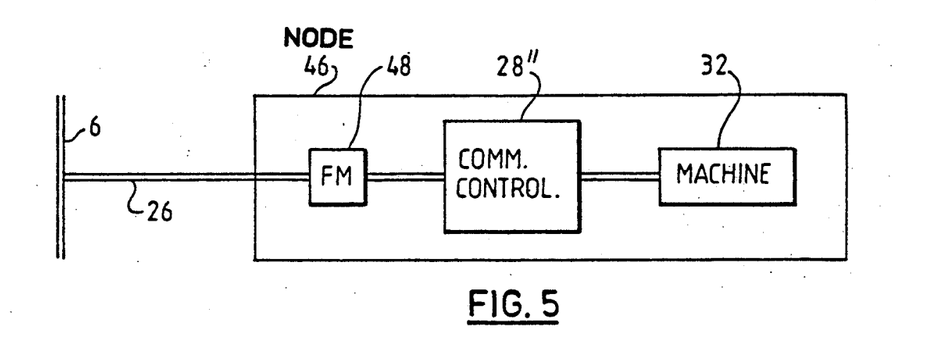
FIG. 5 is a schematic block diagram of the architecture of low-cost network node, for transmitting on a single, fixed channel.

It may also be desired to provide some nodes on a network in the form of a simple node 46 such as that shown in FIG. 5, with a single non-switchable modem 48. For example, a node which merely needs to issue very short messages (e.g. indicating an error condition) may not need to use an allocatable channel. Such nodes may be implemented by means of an architecture as shown in FIG. 5. The communication controller 28''', having determined that an error message is to be sent, transmits the error message as a short message on a channel designated for this purpose. The channel for this purpose could be the control channel, or it could be a dedicated channel especially set aside for the error messages.

It will be appreciated that in this way it is possible to retain full plug compatibility with single channel equipment such as that shown in FIG. 5, from a prior art token-protocol network based on the Manufacturing Automation Protocol (MAP).

The simplest procedure is to allow the prior art equipment to communicate solely on the control channel. The prior nodes would use the control channel for all purposes, including communicating with the new nodes. The presence of such prior equipment on the network will, however, reduce the performance of the network as the token retention time will have to take account of the amount of data which a node with such equipment will put on the token-passing channel.

Another approach is to keep the new control channel separate from the old operating channel, and use the protocol to allocate a channel to the old equipment. A gateway would then have to be provided to interconnect the two sets of nodes; the gateway computer being responsible for requesting and maintaining the allocated channel. This would allow the new equipment to realise the full potential performance of the protocol, while the old would operate as before on a logically separate LAN on the same physical communication medium.

It will be appreciated that it is possible for a node to comprise more that two channel adapters. An example of a case where it may be desirable for there to be a third channel adapter in addition to the two shown in FIG. 3, is where a channel separate from the control channel is specifically dedicated for error messages. This separate, dedicated channel could operate under a token-passing protocol as discussed above. Another example of a node where it may be desirable to have more than two channel adapters is in a node which serves as a gateway between different logical networks set up on the single physical communication medium.

The communication controller 28, 28', 28'' in each station participating in the token-passing scheme on the control channel maintains information about the state of the network in the form of predecessor and successor node addresses and a channel status table.

The predecessor and successor node addresses are maintained in accordance with IEEE 802.4. Where a node has two modems, as illustrated in FIG. 3, one for connection solely to the control channel and one for the allocatable channels, or a single non-switchable modem permanently allocated to the control channel as illustrated in FIG. 5, these addresses are not used for any other purpose than ring maintenance as in IEEE 802.4. Where, however, there is a single switchable modem as illustrated in FIG. 4, the addresses are also used for initiating action to take account of changes when a neighbouring node leaves the channel.

The channel status table (not shown) is a compact table which is preferably implemented in memory associated with the communications controller. The channel status table only requires one bit per channel for storing the occupancy condition of each of the channels which may be allocated. It is maintained by communications controller, which interprets all the channel allocation messages passing over the network, regardless of their destination address.

The protocol used on the control channel in this example is as specified by IEEE standard 802.4, with the additional requirement that the maximum length of any transmission, including token transfer, on the control channel is limited to a low value (e.g. the 75 bytes referred to in Table 1). This restriction is made possible because the transmission of longer messages is removed from the control channel to one of the allocated channels; and it does not impair compatibility with other OSI equipment because, if a node on the network exceeds the limit value, it will not cause an error, it will simply reduce the extent of performance improvement.

The message packets or frames transmitted on the control channel in this example have the fields indicated in Table 2, below.

TABLE 2

| Field No | Length (bytes) | Field Name |
| --- | --- | --- |
| 1 | 3 | Preamble |
| 2 | 1 | Start Delimiter (SD) |
| 3 | 1 | Frame Control (FC) |
| 4 | 6 | Destination Address (DA) |
| 5 | 6 | Source Address (SA) |
| 6 | 34 max | Control Channel Data Unit (CCDU) |
| 7 | 4 | Frame Check Sequence (FCS) |
| 8 | 1 | End Delimiter (ED) |
| 9 | 1 | SD |
| 10 | 1 | FC = token identifier |
| 11 | 6 | Token Successor Address |
| 12 | 6 | SA |
| 13 | 4 | FCS |
| 14 | 1 | ED |
| Total | 75 max | |

It should be noted that 6 byte addresses are used to comply with the OSI global addressing standard. It will be noted also that the message packet shown in Table 1 is effectively two messages concatenated together; hence the two start delimiters and the two end delimiters. Fields 9 to 14 are omitted in those cases where the token is not passed on immediately after the message is transmitted. In general this will only occur during ring maintenance.

The Control Channel Data Unit (CCDU) contains the fields indicated in Table 3 below.

TABLE 3

| Field No | Length (bytes) | Field Name |
| --- | --- | --- |
| | | EITHER |
| 1 | 1 | Data unit Type |
| 2 | 1 | Channel Number (CN) |
| 3 | 6 | Token predecessor address |
| 4 | 26 max | Allocated channel protocol data |
| | | OR |
| 1 | 1 | Data Unit type |
| 2 | 33 max | Unrestricted data |
| Total | 34 max | |

The Data Unit Type field determines whether the Data Unit is a Channel Allocation Request, a Channel Allocation Response, a Channel Release Request, a Channel Release Response, a Channel Abort or a Short Message. In the first five cases, the second field contains the channel number concerned, and the third field contains the address of the source node's token predecessor, for use in passive ring maintenance, if needed.

This packet format is entirely within the constraints of IEEE 802.4, with the additional constraint of a very low length limit.

The functions carried out by the participants in the control channel include those required by IEEE 802.4 and additionally those needed to maintain the channel status table.

The communication controller of each participant in the control channel not currently in possession of the token listens to the traffic on the bus for maintaining the internal tables of information about the current state of the network.

The communication controller maintains a record of the addresses of its predecessor and successor in the ring as required by IEEE 802.4. Whenever one of these addresses appears in a Channel Allocation Request or Response, it is assumed that that node is leaving the ring. Accordingly, the address is replaced by its predecessor or successor address, obtained from the Channel Allocation Request or Response message.

The communication controller node additionally maintains its channel status table showing the occupancy of each of the allocatable channels. Whenever a channel number appears in a Channel Allocation Request that channel is flagged as occupied, and when a channel number appears in a Channel Release Response or a negative Channel Allocation Response message, that channel is flagged as unoccupied, respectively in the appropriate location in the channel status table. These terms will be explained later.

In the case of a node having a single, switchable modem and no second modem, when this node leaves the ring to use another channel, the table becomes inaccurate; so on rejoining the ring, the table is restored using information transmitted by the admitting note. This may be performed using the ring maintenance procedures of IEEE 802.4. However, as mentioned above, some delay can be experienced at this stage.

Channel negotiation/short message functions are carried out whenever the node wishes to use the network to carry data, either by the allocation of a channel, or by using the control channel to carry a message in the CCDU field.

A short message is a single packet on the control channel, which may or may not require a response. It contains the fields indicated in Table 4, below.

TABLE 4

| Field No | Length (bytes) | Field Name |
| --- | --- | --- |
| 1 | 3 | Preamble |
| 2 | 1 | Start Delimiter (SD) |
| 3 | 1 | Frame Control (FC) |
| 4 | 6 | Destination Address (DA) |
| 5 | 6 | Source Address (SA) |
| 6 | 1 | Data Unit type = Short Message |
| 7 | 33 max | Message text |
| 8 | 4 | Frame Check Sequence (FCS) |
| 9 | 1 | End Delimiter (ED) |
| 10 | 1 | SD |
| 11 | 1 | FC = token identifier |
| 12 | 6 | Token Successor Address |
| 13 | 6 | SA |
| 14 | 4 | FCS |
| 15 | 1 | ED |
| Total | 75 max | |

When a node wishes to use an allocatable channel for a point-to-point link the following sequence of operations is performed.

1. The initiating node consults its channel status table to identify an unoccupied channel. If none exists, it waits until one becomes available.

2. On receiving the token, the node issues a Channel Allocation Request message, addressed to the intended recipient and naming the channel, and immediately passes on the token. Other nodes will then interpret this packet and identify that channel as occupied. There is no possibility of the same channel being requested simultaneously by two nodes, since only the node in possession of the token can transmit. If there were no unoccupied channel available, the initiating node could, on receiving the token, send a Short Message to the recipient to indicate that a long message is pending.

3. The recipient, after receiving a Channel Allocation Request message, and recognising its address in that message, waits until it receives the token, and then transmits a Channel Allocation Response message, which may be positive or negative to indicate acceptance or rejection, to the initiator. If the response is positive, the recipient switches its switchable modem to the allocated channel. This response message will be interpreted by other nodes, and used either to confirm or cancel the occupied status of the channel. The initiator, on receiving the response message, switches its switchable modem to the named channel and begins transmission.

In the case of a single modem, if for any reason communication is not established on the allocated channel within a time-out period, and in any case after completion of the communication on the allocated channel, both initiator and recipient return to the control channel and rejoin the ring.

The following sequence of messages is issued to release a channel when a point-to-point link is no longer needed.

1. Either of the participants in the link transmits a Channel Release Request message addressed to the other.

2. On receipt of that, and after transmitting any waiting traffic on the allocated channel, the other participant transmits a Channel Release Response message to the first participant. Other nodes will interpret this packet, and flag the named channel as unoccupied.

3. Additionally, as confirmation of the release of the channel, either participant may broadcasts a Channel Release message on the control channel, naming the channel just released. This confirmation is needed for the single modem case where the Channel Release transmissions in steps 1 and 2 are on the allocated channel.

As an alternative to the above procedure, either participant may transmit a Channel Abort message to the other. Both participants must then cease using the allocated channel immediately and discard any waiting traffic. The Channel Abort message indicates to other nodes that the channel is freed, and the optional confirmation procedure may be used. Once again, the confirmation is need for the single modem case to indicate over the control channel to the other nodes that the channel is freed.

When an allocatable channel is required for a multi-node network, using a protocol such as token-passing or CSMA/CD protocol, a different sequence of steps is performed. As has always been the case, every such network has a special station, usually called the Network Manager, which is responsible for administration of the network, directory services etc. The sequence of steps is as follows.

1. The node containing the Network Manager of a logical network, having found an unoccupied channel, transmits a Channel Allocation Request packet, followed by a Channel Allocation Response packet, both addressed to itself. This has the effect of reserving the channel and notifying other nodes that it is occupied.

2. Every node which subsequently wishes to take part in the logical network transmits a Channel Number Request packet addressed to the Network Manager.

3. The Network Manager responds with a Channel Number Response packet containing the number of the channel allocated for that logical network, and a code identifying the protocol to be used on that channel.

4. The node then joins the network on the allocated channel, using whatever joining procedure is laid down by the protocol. It may subsequently leave the logical network in the same way.

The Channel Number Request packet is really a special case of the Channel Allocation Request packet, and may be realised as a Channel Allocation Request packet with an empty address field. Similarly, the Channel Number Response packet may be the same as the Channel Allocation Response packet.

On closing a logical network, once all the participants in a logical network except the Network Manager have left it, the Network Manager may, if appropriate, release the channel by transmitting Channel Release Request and Response frames addressed to itself; by transmitting a Channel Abort packet to itself; or simply by broadcasting a Channel Release packet.

Figure 6:
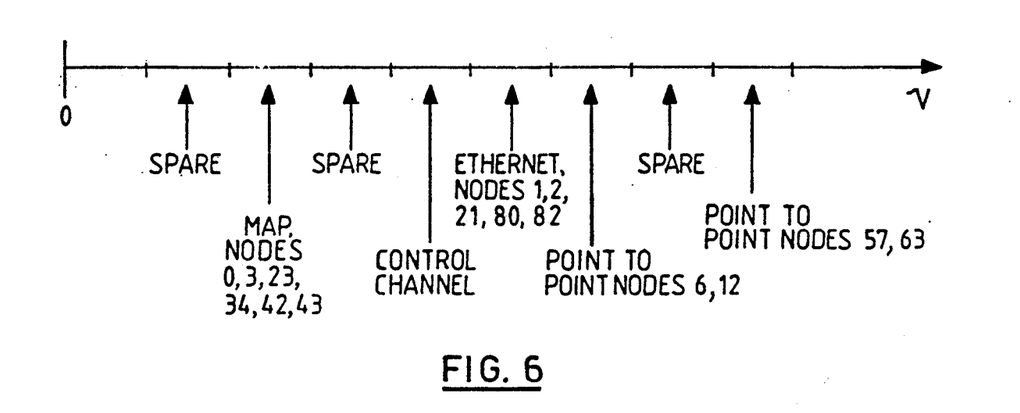
FIG. 6 is a schematic illustration of an example of channel allocation on a communication network in accordance with the invention.

FIG. 6 is a schematic illustration of an example of channel allocation on a communication network in accordance with the invention. It is assumed in this example that there are 100 nodes on the network as described above, the nodes being numbered 0 to 99. It will be noted that in addition to the control channel, there are channels currently unallocated and channels supporting communications under a MAP protocol, an Ethernet protocol and communications on a point to point basis. The allocation of these channels was made as described above (i.e. under the token-passing protocol on the control channel). It should be noted that FIG. 6 is purely schematic, and the width of the channels shown does not represent their relative bandwidths. The bandwidth of each of the channels could be the same. Equally, channels of differing bandwidths may be provided and the channels may be allocated in accordance with bandwidth requirements for the communications to be performed. This may be done by preselecting a plurality of channels of different bandwidths, or by dynamically determining the bandwidths of the channels.

A particular example of a communication network in accordance with the invention has been described above, in the form of an industrial Local Area Network (LAN). However, it will be apparent that the invention is applicable to other environments, such as satellite transmission, or wide area networks. Accordingly, the invention is not limited to LANs, and particularly not limited to the LAN described herein. The communication medium of the preferred example described above is a broadband cable. However, it will be appreciated that the invention is applicable to communication networks using other communication media, such as electromagnetic communication through free space, fibre optic cables and so on, where the communication medium be divided into channels (e.g. by means of frequency division multiplexing (FDM)), and all messages are broadcast into the transmission medium in such a way that they can be received by all receivers connected to the medium.

It will be appreciated that further modifications and additions to the communication network described in the above are possible within the scope of the present invention. For example, in the particular example described above, dual modems are used, the control channel protocol is IEEE 802.4, unacknowledged and the message length limit is set to 75 bytes. However, in another example of a communication network in accordance with the invention:

single switchable modem nodes may be used instead of, or in addition to the dual modem nodes of the above network; and/or a token-passing protocol not in accordance with IEEE 802.4 may be used on the control channel; and/or the message length limit in the control channel may be set to another value, chosen to optimise performance in particular circumstances; and/or acknowledged, rather than unacknowledged messaging may be used in the control channel.

In summary, the invention provides a communication network which:

enables wide compatibility to be achieved because the control channel can be arranged to adhere to an existing protocol (for example, in the network described above, software compatibility need not be compromised because the high layers of the architecture adhere to the standards of the OSI model);

enables high performance to be achieved because the bulk transfer of data is handled by allocated channels, and does not therefore interfere with the process of gaining access to the network and sending high priority short messages;

enables a high degree of flexibility because its performance is high enough to enable the elimination of physically separate sub-network structures for real-time control, and affords the opportunity to allow equipment using non-standard protocols to be integrated into the network and brought under the control of the token-passing operating protocol; and affords the opportunity to increase reliability and maintainability by introducing redundancy into the network, in the form of distributed processing making use of the high performance.

In addition, a communication system in accordance with the invention provides the potential for bringing the total management of a cable system—not just the channels allocated to the computer network—under the control of the protocol. This is a great advantage where the cable is required to carry non-computer signals such as video or voice communications. Instead of the permanent allocation of channels to such purposes, with consequent inability to remove them rapidly in case of equipment malfunction, the channels are allocated dynamically and can be managed by the nodes in the network and/or under the control of a controlling computer.

Some ways of making use of the facilities which can be provided in a communication network based on the invention are:

point-to-point communications on a control channel, in which each data transmission requires the allocation of a channel between the sender and every intended recipient;

multi-network configurations, in which multiple logical networks, all using the same protocol but each on a separate channel, are established on the common communication medium.

multi-protocol configurations, in which multiple logical networks, using different protocols and on separate channels, are established on the common transmission medium.

short message transmission on the control channel for:

(i) rapid transmission of high priority messages;

(ii) communicating with a node or nodes which are not part of a particular logical subnetwork in order to provide a measure of cross-network communication (Note that this provides none of the data transformation features of OSI, so it requires individual handling by the application program initiating the communication);

(iii) communication between network management agents and a network manager (most OSI protocols call for network management agents to be present in each of the nodes on a network);

the provision of some low cost nodes operating only on the control channel, for connecting simple sensors or actuators to the network in such a way that they could be addressed by a data collector/distributor which is simultaneously a member of, say, a logical MAP network;

coping with errors on a logical subnetwork (e.g. If a node fails in 'jabber' state—i.e., constantly transmitting noise on to the network—the fault can be located and cured by moving nodes one by one to another channel).

In the above specific example of a communication network according to the invention, ring maintenance is performed in accordance with IEEE 802.4. This can cause delays when nodes having a single switchable modem wish to rejoin the token-passing channel on releasing an allocated channel. This is because the updating of the predecessor and successor information for adding a node to the token-passing channel takes place during ring maintenance, and this does not occur during every token ring cycle under IEEE 802.4. Ring maintenance is optimised in accordance with IEEE 802.4 on the assumption that long messages as well as short ones are being transmitted on the token-passing channel. In the case of a token-passing channel having messages with a limited message package length in a network in accordance with the invention, yet further improved performance can be obtained for nodes having a single switchable modem by adopting a revised ring maintenance strategy. By adopting the strategy outlined below, the time taken between ring maintenance operations can be reduced.

As a part of this revised strategy, each node maintains a flag called the Ring Maintenance flag, or RM flag, which indicates whether ring maintenance has been performed during the last complete rotation of the token. The RM flag is reset on relinquishing the token, except when ring maintenance has been carried out by the relinquishing node, and is set when ring maintenance is observed to be carried out by another node.

Ring maintenance under this revised strategy is carried out:

if no response is heard within one slot time after passing on the token (an error condition); or if the RM flag is not set when the token is received.

This ensures that, in the absence of errors, it is carried out by each node in turn, with a complete token rotation between occurrences. The principal aim of this is to make the time taken to rejoin the ring more predictable.

The functions carried out in accordance with this ring maintenance strategy are substantially the same as those of the 'solicit successor' procedure of IEEE 802.4, which will be known to one skilled in the art. One extra function is carried out in addition to the solicit successor procedure, however. That is the transfer of the Channel Status Table, whenever a node has been admitted to the ring, to the newly admitted node. The table can be sent as a Short Message to the new node, at the same time that the token is passed on.

I claim:

1. A communication network for communication between a plurality of nodes (1-5) connected together over a multi-channel communication medium (6), the network comprising a plurality of allocatable channels (30, 30', 30") to be allocated for data communication between said nodes (1-5) and a control channel (26) for allocating the allocatable channels (30, 30', 30") to individual nodes (1-5), characterized in that at least one of the allocatable channels (30, 30', 30") operates under a token-passing protocol with a limited message packet length whereby selected message packets may be sent between nodes (1-5) with a predetermined maximum delay and wherein said at least one channel operating under a token-passing protocol with a limited message packet length is said control channel (26), and wherein the message packets transmitted by said nodes (1-5) over said control channel (26) comprise messages for negotiating the allocation of said allocatable channels (30, 30', 30") to said individual nodes (1-5).

2. A network as claimed in claim 1 wherein the message packets transmitted by said nodes (1-5) over said control channel (26) also comprise data messages not used for negotiating the allocation of said allocatable channels (30, 30', 30"), whereby urgent data messages can be communicated between nodes (1-5) over said control channel (26) without needing to wait for the allocation of one of said allocatable channels (30, 30', 30").

3. A network as in claim 1 or 2 further including at least one separate, dedicated said allocatable channel other than said control channel (26), operating under a token-passing protocol with a limited message packet length, over which message packets comprising data messages not used for negotiating the allocation of said allocatable channels are transmitted by said nodes (1-5), whereby urgent data messages can be communicated between nodes (1-5) over said separate dedicated channel without needing to wait for the allocation of a said allocatable channel (30, 30', 30").

4. A network as claimed in claim 1 or 2, wherein more than two of said nodes (1-5) communicate on one of said allocatable channels (30, 30', 30"), thereby establishing a sub-network on said allocatable channel (30, 30', 30").

5. A network as claimed in claim 4 in which said sub-network operates under a suitable network protocol.

6. A network as claimed in claim 5 having a plurality of said sub-networks and wherein each of said plurality of sub-networks operates on a separate said allocatable channel (30, 30', 30") and each said sub-network operating under the same or different protocol, or no protocol.

7. A network as claimed in claim 1 or 2, wherein each said channel (26, 30, 30'30") operates in a respective frequency band.

8. A network as claimed in claim 7 wherein bandwidth of one or more of the channels (26, 30, 30'30") is selectable.

9. A network as claimed in claim 7 wherein one or more nodes (1-5, 20;42) each comprises a switchable first communication adapter (22) which is switchable between frequency bands, whereby said one or more nodes (1-5,20;42).can communicate on a selectable one of said plurality of channels (26, 30, 30'30").

10. A network as claimed in claim 9 wherein at least one node (1-5; 20) additionally comprises a second communication adapter (24) which is operable in at least the frequency band of said control channel (26) operating under a token-passing protocol with a limited message packet length, whereby said at least one node (1-5; 20) can communicate simultaneously on said control channel (26) and on one of said allocatable channels (30, 30', 30").

11. A network as in claim 10, wherein said first and second communication adapters are fixed frequency band communication adapters (48) which operate solely in the frequency band of said control channel (26) operating under a token-passing protocol with a limited message packet length, whereby communication by means of said fixed frequency band communication adapter (48), is solely on said control channel (26).

12. A network as claimed in claim 10, wherein said first and second communication adapters (22, 24, 48) are modems.

13. A network as claimed in claim 9 wherein one of said nodes (1-5; 42) maintains a ring maintenance flag for indicating whether ring maintenance has been performed during a preceding complete rotation of a token on said token-passing channel (26), a logical ring being formed by the passing of said token on said token-passing channel and wherein said ring maintenance is performed if said ring maintenance flag is not set when said token is received by said node (1-5; 42).

14. A method of managing communications of time-critical messages over a multi-channel communication network including a plurality of individual nodes interconnected on said network comprising the steps of:
providing a plurality of allocatable channels for communication between said nodes;
providing a control channel for allocating said allocatable channels to said individual nodes;
operating at least one of said allocatable or control channels under a token-passing protocol having a limited message packet length and a predetermined maximum transmission delay;
transmitting time-critical messages over said allocatable or control channel operating under said token-passing protocol and limited message packet length; and
transmitting non-time-critical messages over at least one of said allocatable or control channels a not operating under said token-passing protocol.

* * * * *

UNITED STATES PATENT AND TRADEMARK OFFICE
CERTIFICATE OF CORRECTION

PATENT NO. : 5,081,623

DATED : January 14, 1992

INVENTOR(S) : Frank Ainscow

It is certified that error appears in the above-identified patent and that said Letters Patent is hereby corrected as shown below:

Column 18, line 50 delete "a".

Signed and Sealed this

Twenty-fifth Day of May, 1993

Attest:

MICHAEL K. KIRK

Attesting Officer

Acting Commissioner of Patents and Trademarks